United States Patent [19]

Bishop et al.

[11] Patent Number: 4,849,877
[45] Date of Patent: Jul. 18, 1989

[54] VIRTUAL EXECUTION OF PROGRAMS ON A MULTIPROCESSOR SYSTEM

[75] Inventors: Thomas P. Bishop, Aurora; Robert W. Fish, West Chicago; James S. Peterson, Aurora, all of Ill.; Walter E. Tuvell, Jr., No. Plainfield, N.J.

[73] Assignees: American Telephone and Telegraph Company, New York, N.Y.; AT&T Information Systems Inc., Morristown, N.J.

[21] Appl. No.: 941,700

[22] Filed: Dec. 22, 1986

[51] Int. Cl.[4] .............................................. G06F 09/30
[52] U.S. Cl. .................................. 364/200; 364/230.3; 364/281.3; 364/300
[58] Field of Search ... 364/200 MS File, 900 MS File, 364/300

[56] References Cited

U.S. PATENT DOCUMENTS

| | | | |
|---|---|---|---|
| 3,593,300 | 7/1971 | Driscoll, Jr. ........................ | 364/200 |
| 4,530,051 | 7/1985 | Johnson et al. .................... | 364/200 |
| 4,547,849 | 10/1985 | Louie et al. ......................... | 364/200 |
| 4,703,420 | 10/1987 | Irwin .................................. | 364/200 |
| 4,731,736 | 3/1988 | Mothersole et al. ................ | 364/900 |

OTHER PUBLICATIONS

Computer, vol. 15, No. 4, Apr. 1982, pp. 55-65, IEEE, Long Beach, Calif., US; K. Hwang et al. "A Unix-based Local Computer Network with Load Balancing".

R. M. McKeag et al., "Studies in Operating Systems", 1976, pp. 27-35, Academic Press, London, GB.
IEEE Infocom '86, Fifth Annual Conference, Computers and Communications Integration Design, Analysis, Management, Miami, Florida, Apr. 8th-10th 1986, pp. 405-414, IEEE; A Faro et al: "Theory and Implementation of Distributed System Management".
AT&T Book, Chapter 13, Copyright 1986, pp. 412-431, "The Design of the UNIX ® Operating System", Maurice J. Bach.
Sun Microsystems, Inc. Manual, Jan. 1985, p ii-12, "Remote Procedure Call Protocol Specification".
Electronics Article, Jul. 1983, pp. 118-124, "Unix Variant Opens a Path to Managing Multiprocessor Systems", Paul Jackson, Convergent Technologies, Santa Clara, Ca.
Thesis, May 1981, "Remote Procedure Call", Bruce Jay Nelson, Ser. No. 416,649, filed Sep. 10, 1982.

Primary Examiner—Eddie P. Chan
Attorney, Agent, or Firm—John C. Moran

[57] ABSTRACT

A multiprocessor system automatically responding to a request for executing a new program to establish an extended process that spans a plurality of processors each having resources required for the execution of the new program. Initially, the extended process comprises an user process that is requesting the execution of the new program. Stub processes are created as required to gain access to the object code file of the new program, to allocate a processor to execute the new program, and to initialize the allocated processor for execution for the new program.

10 Claims, 6 Drawing Sheets

VIRTUAL EXECUTION OF PROGRAMS ON A MULTIPROCESSOR SYSTEM

CROSS-REFERENCE TO RELATED APPLICATIONS

Concurrently filed herewith and assigned to the same assignees as this application are:

T. P. Bishop, et al., "InterProcessor Communication Protocol", Ser. No. 942,702;

T. P. Bishop, et al., "Controlled Dynamic Load Balancing for a Multiprocessor System", Ser. No. 941,701; and T. P. Bishop, et al., "Extended Process for a Multiprocessor System", Ser. No. 944,586.

TECHNICAL FIELD

Our invention relates to computer operating systems and more particularly to initial execution of a program on a multiprocessor system by an extended process that is active on a plurality of processors simultaneously.

BACKGROUND OF THE INVENTION

The use of operating systems to control the execution of programs on a single computer or processor and the utilization of system resources such as I/O devices and memory by those programs while executing is well known in the art. One such operating system is the UNIX operating system which is described in the article by K. Thompson, "UNIX Implementation" the Bell System Technical Journal, July-August, 1978, Volume 57, Number 6. The UNIX operating system described in this article is designed to control the resources of a single processor. The execution of a new program is described on page 1933 of this article which describes the standard "fork" and "exec" system calls. The procedure is to execute the fork system call which replicates the executing process into a child and parent process. These processes share the same program, but have different data storage. The child then executes the exec system call. The execution of the exec system call results in a new program being executed. Further information on the Unix operating system is given in the book of M. J. Bach entitled *The Design Of the Unix Operating System* Prentice-Hall, 1986, Englewood Cliffs, N.J. Other known operating systems have similar system calls.

Whereas the exec system call of the UNIX operating system described in the article by Thompson is an extremely effective mechanism for causing the execution of a new program, it is not capable of operating in a multiprocessor environment where the exec system call executes on one processor but causes the new program to commence running on yet a second and unspecified processor. Operating systems for causing the execution of specialized procedures or subroutines on other processors in a multiprocessor environment are known. However, these systems require that the procedure or program already exist on the other processor. One such system is described in U.S. Pat. No. 4,530,051, of J. W. Johnson et al. This patent describes a multiprocessor system whereby one processor can cause the execution of a procedure, or as it is often called a subroutine, on another processor. The problem is that the procedure must already exist on the other processor before execution. A similar system is described in the article by P. Jackson, "UNIX Variant Opens a Path to Managing Multiprocessor Systems", July 28, 1983. In this article, a system is described whereby a program executing on one processor can obtain access to an I/O device, such as a disk drive, by causing a procedure to run on another processor which controls the disk drive. When information is obtained from the disk drive the other processor transfers this to the requesting processor. This article does not describe the general capability of automatically causing a program to be retrieved from a disk and executed on the remote system without the program having been previously designated as existing on that system.

Another method of executing programs in a second processor from a first processor is detailed in the "Remote Procedure Call Protocol Specification" Manual, Part No. 800-1177-01, Sun Microsystems, Inc., 2250 Garcia Avenue, Mountain View, Calif., 94043. This manual gives details on the remote procedure call as implemented by Sun Microsystems, which is an addition to the UNIX operating system. The remote procedure call allows procedures to be executed on a second processor from a first processor.

The problem that exists in the prior art is that there is not a general way to cause the execution of a new program in a multiprocessor system so that the system call executing that program is free of considerations dealing with the loading of the various processors within the multiprocessor system, the physical location of the program whether it be in memory or in a file system, and the setting up of the necessary signaling paths if the execution of the program requires the system call performing this function to span a number of processors within the multiprocessor system.

SUMMARY OF THE INVENTION

This invention is directed to solving these and other problems and disadvantages of the prior art. According to the invention, a multiprocessor system is automatically responsive to a request for executing a new program thus establishing an extended process that spans a plurality of processors each having resources required for the execution of the new program. Initially, the extended process comprises a primary process that is requesting the execution of the new program. Advantageously, auxiliary processes are created as part of the extended process as required to gain access to the object code file of the new program, to allocate a processor to execute the new program, and to initialize the allocated processor for execution of the new program.

Advantageously, a method for starting the execution of a new program in a multiprocessor system comprises the steps of: determining a processor associated with the object code file of the new program, creating a first auxiliary process on the determined file processor upon the file processor having been determined to be different than the initiating processor, allocating another processor for executing the object code file of the new program, creating a second auxiliary process on the allocated executing processor upon the executing processor being different than the initiating processor or file processor, transferring process information from the first primary process on the initiating process to the second auxiliary process, transforming the second auxiliary process into the primary process, and executing the object code file by the primary process in conjunction with the first auxiliary process.

Advantageously, the allocating step comprises the steps of communicating a first packet from the initiating processor to the file processor to request that the first auxiliary process read a portion of the object code file, reading the requested portion of the object code file by the first auxiliary process, and communicating a second packet containing the read portion to the initiating processor from the file processor.

In addition, the system has a designated host processor which executes a process manager function that performs processor assignment and the allocating step further comprises the steps of: communicating a third packet to the host process or to request that the processor assignment be made for the new program, assigning the executing processor to execute the new program by the host processor running the process manager function, and communicating the assignment information via a fourth packet to the initiating processor.

Also, a portion of the object code file contains a first set of processor assignment parameters and the initiating processor has a second set of processor assignment parameters stored in a subset of the second auxiliary process information and the third packet contains the first and second sets of processor assignment parameters and the assigning step further comprises the steps of reading the sets of processor assignment parameters from the third packet and designating the executing processor for the processor assignment in response to the sets of processor assignment parameters.

In addition, the process information associated with the first primary process allows the first primary process to function as the primary process of the extended process and the transferring step comprises the steps of reading the process information by the initiating processor, forming the process information into a fifth packet by the initiating process, and transmitting the fifth packet from the initiating processor to the executing processor.

Advantageously, the transforming step comprises the steps of reading the process information from the fifth packet and storing the process information into the second auxiliary process and converting the second auxiliary process into the first primary process. Also the step of converting changes the original first primary process into a third auxiliary process. In addition, the step of converting further comprises the step of sending a sixth and a seventh packet to the first and third auxiliary processes, respectively, to inform the latter processes that the second auxiliary process has become the primary process and that the former primary process is now the third auxiliary process.

These and other advantages and features of the present invention will become apparent from the following description of an illustrative embodiment of the invention taken together with the drawing.

DETAILED DESCRIPTION

Figure 1:
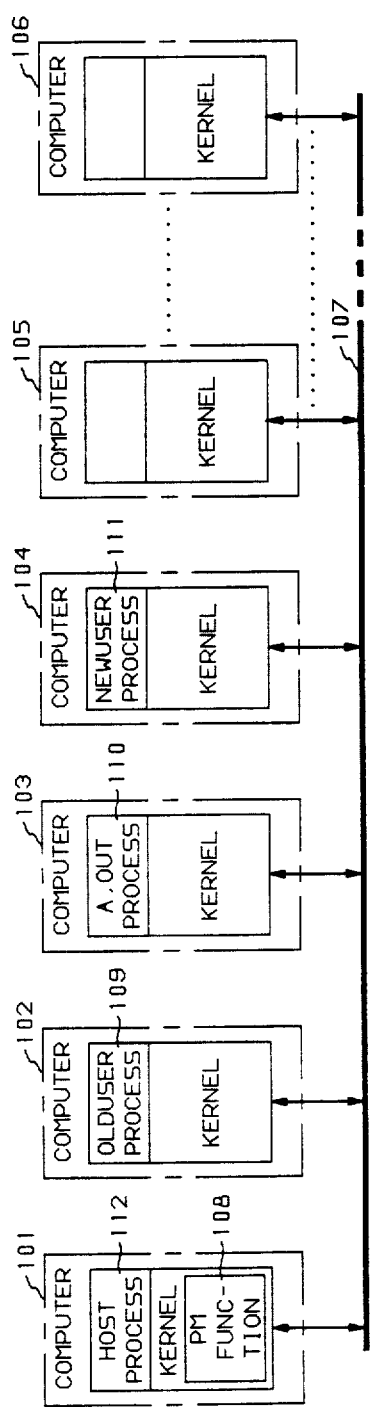
FIG. 1 illustrates, in block diagram form, a multiprocessor system for utilizing the present invention.

FIG. 1 shows a multiprocessor system having a plurality of computers 101 through 106 interconnected by bus 107. Some of the computers illustrated in FIG. 1 have particular functions. For example, computer 101 is considered to be the host computer, and computers 105 through 106 may be designated as computational servers or file servers. Each computer operates under control of an operating system kernel which illustratively is a version of the UNIX operating system described in the article by Thompson. Whereas the operating system kernel described by Thompson is restricted to only a single computer, the kernels of FIG. 1 allow a process to be extended over a number of computers. This extended process is a collection of individual special processes running on separate computers and is described in greater detail later in this section. These special processes are also referred to as primary or user and auxiliary or stub processes. Each kernel associated with the extended process maintains a distinct process necessary to allow the extended process to function on the computer controlled by the associated kernel. Each computer has associated memory and I/O devices; however, certain computers may be interconnected to special I/O devices such as telecommunication data interfaces or mass storage devices.

The initiation of a new program in the system illustrated in FIG. 1 results in that program being automatically assigned to an unspecified computer that has processing capacity to spare or which has special I/O resources required by the program. The unspecified computer may be the same computer executing the request or a different computer. The execution of the program can be distributed over a number of computers utilizing one computer which has processing capacity and yet using one or more computers which have the necessary files or special I/O capabilities. When program execution is distributed, an extended process is created. The operation of initiating the execution of a program so as to allow the execution of the program to be performed among a plurality of computers and yet making this operation transparent to the application programmer is the subject of this invention.

The allocation of resources and dynamic load balancing is performed by process manager (PM) function 108 being executed by computer 101 which is designated as the host computer of the system of FIG. 1. The initiation of the execution of a new program is performed by the exec system call that is modified by this invention so as to allow the operation on a multiprocessor system. Consider the following example which illustrates the execution of the exec system call. Olduser process 109, on computer 102, executes the exec system call. The end result is that the new program is eventually executed by newuser process 111 on computer 104. Initially, the file containing the new program is in the file system of computer 103 and is accessed by a.out process 110. Computers 105 and 106 also have resources that will be utilized by newuser process 111.

In the previously referenced article by Thompson, it was noted that a process is a software unit which requires text, data and bss areas of memory and which is identified to the operating system by a process control block. In the operating system described by Thompson, the process control block is contained in one area of memory since that operating system is executed on a uniprocessor system. In the system illustrated in FIG. 1, the process control block is distributed among all the computers which are associated with the extended process. The extended process comprises processes 112, 110, 111 and possibly processes located in computer 105 and 106 after the exec system call is finished. The extended process consists of a user process and a number of stub processes. The user process has text, data and bss areas of memory in addition to the process control block. A stub process contains only a portion of the process control block relating to operating system functions pertaining to that particular computer's operations with respect to the extended process as required at any point in time.

Upon olduser process 109 executing the exec system call, the kernel of computer 102 transmits a packet to computer 103 to obtain the header portion of the a.out file via out process 110 so as to determine the type of resources required to execute this program. The kernel of computer 102 then transmits a packet to the kernel of computer 101 requesting allocation of resources for the execution of newuser process 111. In response to this request, the kernel of computer 102 executes process manager function 108. In our present example, the kernel of computer 102 transmits back a message designating that computer 104 is to execute newuser process 111 after executing process manager function 108. Further information concerning the operations of process manager function 108 is illustrated in the copending Ser. No. 941,701. The kernel of computer 102 then transmits process control information to the kernel of computer 104 so that the latter kernel can set up newuser process 111 and stub processes in computers 102, 105, and 106 for the future execution of the extended process.

Once this initialization has been performed, the kernel of computer 102 passes the execution of the exec system call to the kernel of computer 104. The latter kernel obtains the a.out file from computer 103. The kernel of computer 104 also transmits messages to the kernels of the other computers informing them that the user process which was initially olduser process 109 has migrated to computer 104 and is now newuser process 111. Olduser process 109 now becomes a stub process. The kernels of the other computers will now direct any signals for olduser process 109 to newuser process 111. Further, the kernel of computer 104 transmits a message to the kernel of computer 102 to recover all signals transmitted to olduser process 109 that arrived at computer 102 before the other computers were informed that the extended process had migrated to computer 104. Once newuser process 111 has been set up and begins to execute, it can utilize the resources of the other computers as required via stub processes that were created in these computers. If, during the execution of the program, it is necessary to access a computer that was not initially designated as being part of the extended process, then the operating system of computer 104 requests the creation of a stub process on that computer necessary to continue execution of the program.

Figure 2:
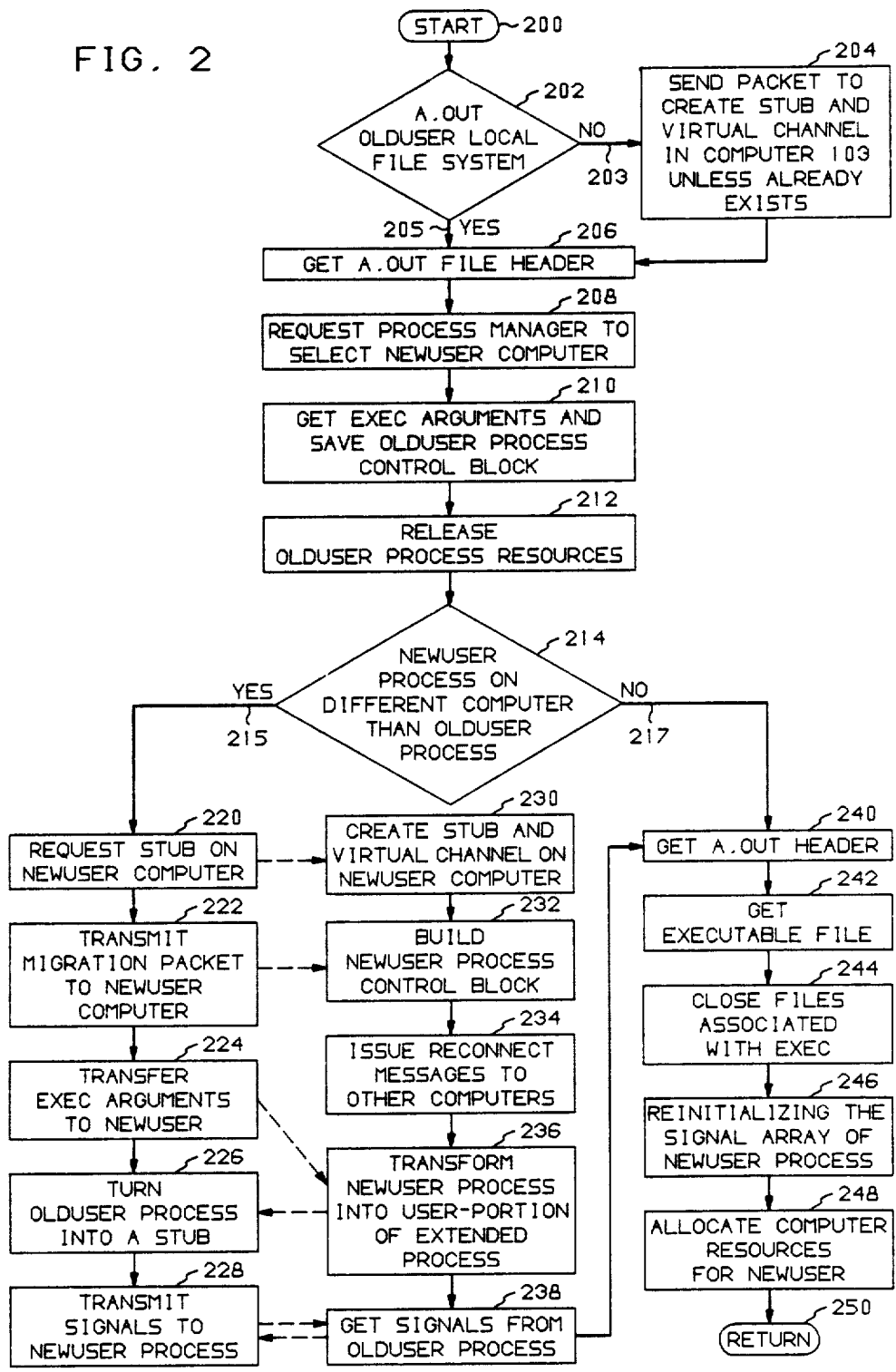
FIG. 2 illustrates, in flowchart form, the functions performed during the execution of an exec system call by the multiprocessor system of FIG. 1.

FIG. 2 illustrates in greater detail the execution of the exec system call and creation of the extended process for the present example. Upon execution of the exec system call by olduser process 109, decision block 202 is performed. The exec system call may specify parameters for influencing the processor assignment. Decision block 202 determines whether or not the file containing the a.out file is local to computer 102 or is on a remote computer. Since the file is on computer 103 in the present example, it is remote; and if a stub process does not already exist on computer 103 for the present extended process, a packet is sent to create a stub process on computer 103. In response to the packet, the kernel of computer 103 creates a.out process 110 that allows access to the a.out file. a.out process 110 then becomes part of the extended process. Block 206 accesses the a.out file located on computer 103 via a.out process 110. The header information is read from the a.out file and is stored in the process control block of a.out process 110. The kernel of computer 103 then transmits a subset of the header to computer 102's kernel which stores the subset in the process control block of olduser process 109 in computer 102. The information obtained from the a.out file at this point specifies the size of the a.out file and may specify parameters for influencing the processor assignment decision. After obtaining the information from the a.out file, the kernel of computer 102 transmits a packet to the kernel of computer 101 requesting that the kernel execute process manager function 108 to select a computer upon which newuser process 111 is to assigned at block 208. This packet contains the information obtained from the a.out file in block 206 and any parameters regarding processor assignment in the exec system call. PM process manager function 108 is responsive to this packet to validate an explicit assignment if one existed in the a.out or exec system call information or to perform a dynamic load balancing for the multiprocessor system illustrated in FIG. 1 in order to make a processor assignment for newuser process 111. In the present example, newuser process 111 is assigned to computer 104.

Next, the kernel of computer 102 executes block 210. The execution of block 210 results in the arguments of the exec system call being read. The kernel of computer 102 is responsive to these arguments and any environment variables from the olduser process 109's address space to transfer this information into a system work area formatting this information into an initial stack for newuser process 111. Block 212 is next executed which releases the resources of olduser process 109 back to the operating system of computer 102. In particular, the address space of olduser process 109 is released.

The actions just performed represent a preexecution stage of the exec system call. If the newuser process is present on a different computer than the olduser process, then blocks 220 through 238 are executed before blocks 240 through 250. In the present example, the kernel of computer 102 executes blocks 220 through 228, and the kernel of computer 104 executes blocks 230 through 238. However, if the olduser and the newuser processes are on the same computer, then the blocks 240 through 250 illustrated in FIG. 2 are executed at this point in time. Decision block 214 determines whether or not the newuser and olduser processes are on different computers. In the present example, olduser process 109 is on computer 102 and newuser process 111 is on computer 104. If a stub process does not already exist on computer 104, the kernel of computer 102 executes block 220 which results in a packet being transmitted over to the kernel of computer 104. This packet requests that a stub process be created which will become newuser process 111 on computer 104. The kernel is responsive to this request to create a skeleton stub process by performing a kernel fork function on a prototype stub process. Each kernel of FIG. 1 maintains a copy of the prototype stub process for the purpose of creating stub processes. The kernel of computer 102 then executes block 222. The latter block results in the transmission of a migration packet from computer 102 to computer 104. The packet contains the initial process control information for newuser process 111. That information was formatted in block 210. The migration packet contains the information necessary to transform the stub for newuser process 111 on computer 104 into a viable user process of an extended process. Viability is defined here to mean that the newuser process has all the information necessary to exit or terminate gracefully if required. A graceful exit is one where all parts of the extended process can be removed from all the computers of FIG. 1 if it is necessary to terminate the extended process.

The principal information contained in the migration packet is the reconnection data for the stub processes and information defining open files of the extended process. This data is used to reattach the stub processes and files that had been attached to olduser process 109 to newuser process 111. The reattachment is performed by rearranging the virtual channels and discussed with respect to FIG. 3. Certain crucial data from the process control block defining process group ID, parent process ID, flagword, user ID, group ID, current directory, private root directory, new argument pointer, and various timekeeping fields are also communicated via the migration packet. The kernel of computer 104 is responsive to the migration packet from olduser process 109 to install the data contained in this packet in the newuser process 111's control block and to issue reconnect messages to all of the stub processes in the other computers. After block 232 and 234 have been performed, the newuser process 111 is considered viable.

The reconnect messages transmitted by block 234 to the other computers cause the kernels of these other computers to transform those computers' portion of the process control block of the extended process to now point to newuser process 111 in computer 104 rather than olduser process 109 in computer 102. The significance of this reconnection is that any signals generated for the extended process by stub processes of other computers are now transmitted to newuser process 111 rather than to olduser process 109.

The operating system of computer 102 now executes block 224 which results in the transfer of the exec arguments and other information to newuser process 111 via the kernel of computer 104 by a series of packets from the kernel of computer 102. The newuser process 111 is then built up by installing these packets into the newuser process 111 address space on computer 104 by the kernel of computer 104. This transforms the newuser process 111 into a more complete user process of the extended process.

The kernel of computer 104 then executes block 236 that sends a message to computer 102 causing the execution of block 226 which results in olduser process 109 being turned into a stub process. The kernel of computer 104 then transmits a request at block 238 to the kernel of computer 102 for all signals destined for the user process of the extended process that may be stored for olduser stub process 109 in computer 102. Computer 102's kernel responds to this message by executing block 228 which transmits these signals to block 238.

The kernel of computer 104 now executes the blocks 240 through 250 in FIG. 2. These latter blocks are executed in the same manner regardless of whether or not the olduser process and the newuser process are on the same computer. First, the kernel accesses the a.out file located on computer 103 via a.out process 110 to obtain the a.out header by execution of block 240. Utilizing the header information, the kernel of computer 104 builds the 35 newuser process 111's address space, including space for text, data, and bss, by loading the various sections from the a.out file into computer 104 from computer 103 by execution of block 242.

After performing this function, the kernel then executes block 244 so as to close any files which were associated with olduser process 109 but will not be associated with newuser process 111.

Figure 4:
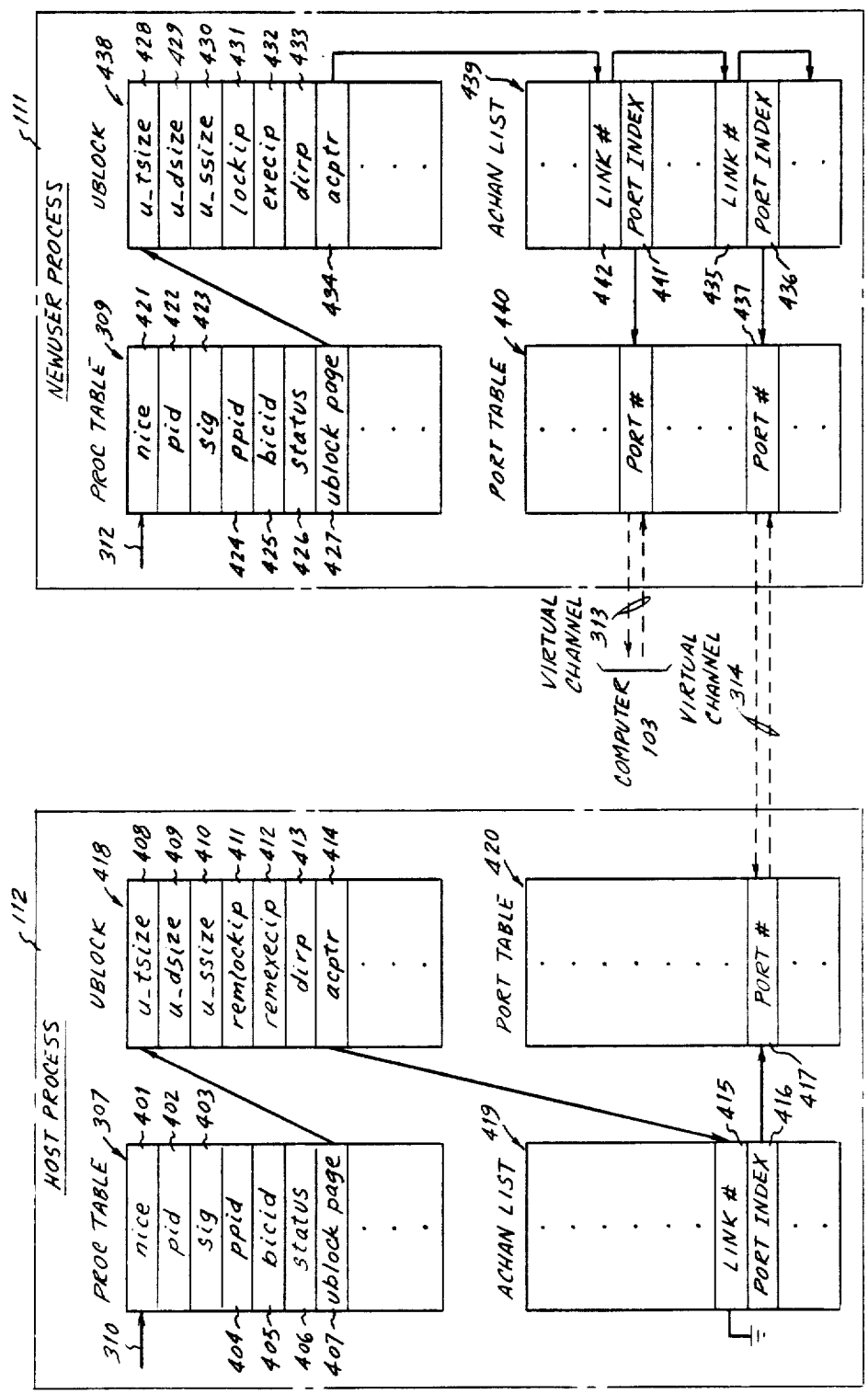
FIG. 4 illustrates, in greater detail, the software interconnection of FIG. 3.

The files that are to be closed are determined by the application programmer. The programmer marks the files to be closed in a standard UNIX manner using the fcntl system call prior to execution of the exec system call. This information is stored in the process control block of olduser process 109 and is later transferred to newuser process 111. After closing all of the marked files, the kernel of computer 104 executes block 246 so as to reinitialize the array of signal-handler fields which contain an entry defining the action to be taken upon receipt of a signal. Each entry can specify one of the following: default value, ignore value, and a pointer identifying a function that services that particular signal. The signals were transmitted from computer 102 to computer 104 in block 228 and combined with signal entry 423 in block 238. The block 246 sets all entries in the signal array pointing to functions to the default value but any entry that contains an ignore value is not modified. When a signal is received for a process, the kernel accesses the process control block for that process and stores the signal in the sig entry, such as entry 423 as illustrated in FIG. 4. When a signal is handled by the kernel, the signal number is used as an index to access the signal array. If the default value is accessed, the process will normally terminate. If the accessed entry contains the ignore value, no action is taken. If the accessed entry contains a pointer, then the function identified by the pointer is executed. When the application runs, the signal system call will be used to configure the array to the requirements of that program. Further information on the handling of signals can be found in the aforementioned book of Bach. Next, the kernel of computer 104 executes block 248 which reinitializes any memory management information required for newuser process 111's new address space and completes all other housekeeping chores. Finally, control is turned over to newuser process 111 so that the program can now execute at block 250.

Figure 3:
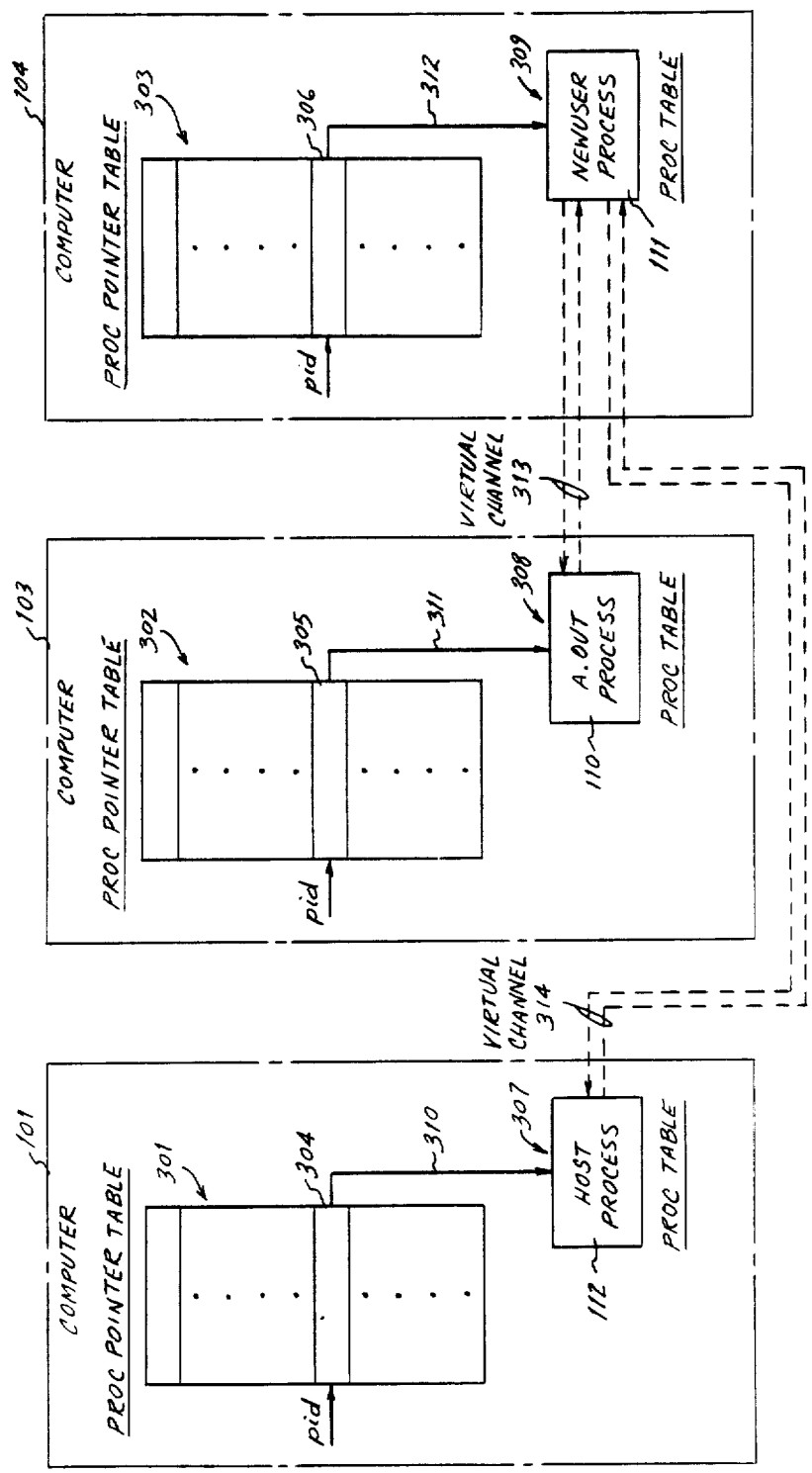
FIG. 3 illustrates, in block diagram form, the interconnection of an extended process for a subset of the processors of FIG. 1.

FIG. 3 illustrates in greater detail a portion of the extended process resulting from the execution of the exec system call. Newuser process 111 is the user process of the extended process and processes 112 and 110 are stub processes of the extended process. All processes of the extended process share a common pid number. Virtual channels are established between the user process of the extended process and the stub processes at the time the stub processes are established. Those channels are utilized for the communication of packets between the user process and the stub processes. Stub processes of the extended process do not directly communicate with each other. In addition, all communication from other processes within the system illustrated in FIG. 1 are directed to the user process of the extended process. Each of the computers illustrated in FIG. 1 maintains a proc pointer table such as 301 through 303 of FIG. 3. The pid number is utilized by the kernel to point into a proc pointer table such as tables 301 through 303 to obtain the pointer such as 304 through 306 to find the designated process. For example, the pid number in computer 104 is used to access entry 306 from proc pointer table 303 that points to proc table 309 via path 312. Similarly, the pid number utilizes to access entry 304 of proc pointer table 301 to obtain path 310 to proc table 307.

Virtual channels 313 and 314 are directly associated with the processes. The identification of these channels is established within the proc table of the individual processes. A user process of the extended process has a virtual channel to each of the stub processes. However, each stub process of the extended process, such as host process 112, has only one virtual channel; and that channel is to the user process of the extended process, such as newuser process 111.

FIG. 4 illustrates in greater detail the memory utilized by host process 112 and newuser process 111 and further demonstrates the differences between a user and stub processes of the extended process. For each of the latter processes, portions of the proc table and the ublock are illustrated. In addition, the port tables and the achan lists are shown. These latter tables identify the virtual channels between the processes. Not illustrated for newuser process 111 are the text, data, and stack areas that are utilized by this process during execution. Similarly, the stack area of memory is not illustrated for host process 112 which is a stub process of the extended process. Newuser process 111 is the user process of the extended process.

Consider now in detail the entries of proc tables 307 and 309. The entries illustrated for tables 307 and 309 are only a portion of the entries that would exist in these tables. The nice entry 401 or 421 defines the scheduling priorities of a process. Nice entry 401 is fixed on a system-wide basis by the system administrator which is true for all stub processes. Since nice entry 421 is for a user process, it is adjustable by the user executing a specific system call allowing the level of priority to be reduced or by actions taken by the system administrator or superuser which can increase or decrease the level of priority. Entries 402 and 422, pid, define the process identification number which is the same for both entries. The pid number is given on an extended process basis so that the user process and all stub processes of the extended process have the same pid number.

The sig entries 403 and 423 coupled with the status entries 406 and 426 are used to handle signals between processes. In addition, the status word of the proc tables also contains conventional UNIX system type information. On a stub, the signals flags contained in the status word indicate whether or not a signal has been received from the user process which in the present example is newuser process 111. Host process 112 is responsive to the receipt of a signal that is stored in entry 403 to perform different operations depending on whether the present operation is interruptible or not. In newuser processor 111, the signal flags in status entry 426 are used to indicate whether a signal has been transmitted to host process 112. In addition, the signal flags in entry 426 also keep track of whether or not the message was ever sent to a stub process such as host process 112. This latter indication is utilized to facilitate cleanup of different types of operations at a later point in time. The type of signal that is received is stored by newuser processor 111 in sig entry 423.

With respect to the parent pid (ppid) entries 404 and 424, these entries are used to keep track of the identity of the parent process of the extended process. This is a conventional UNIX system type field. However, in the extended process, the ppid entry is only valid on the process of the extended process that is being executed by host computer 101 which is host process 112 in the present example. Advantageously, this reduces the amount of communication of packets between various stubs and the user process of the extended process. The user process of the extended process does not have a valid ppid entry unless the user process of the extended process is resident on the host computer.

The bicid variable is used in the following manner to determine whether or not a particular process is a stub or user process of the extended process. Each processor of the multiprocessor system illustrated in FIG. 1 stores the processor's identification number in a variable MYLOC whose contents is the identification number of the processor. Regardless of whether it is a stub or user process, the bicid variable always contains the identification number of the processor that is executing the user process of the extended process. In the present example, this is computer 104. Entry 425 is identical to the contents of the MYLOC variable maintained by the kernel of computer 104. Entry 405 also contains the contents of the MYLOC variable of computer 104 hence does not match the MYLOC variable of computer 101. The kernel of a particular computer determines whether or not it is 10 executing the user or stub process by comparing its bicid variable with the MYLOC variable. If a match results, then the kernel is executing the user process of the extended process.

The ublock page entries 407 and 427 contain address information to setup a virtual address to gain access to the ublocks which are illustrated as ublocks 418 and 438 in FIG. 4. The latter ublocks contain different information depending on whether the ublock is the stub process of the extended process, such as host process 112, or the user process of the extended process, such as newuser process 111. Advantageously, many of the entries of these ublocks are similar to those for the ublocks for the UNIX system described in the aforementioned article by Thompson. Entries 408, 409, and 410 contain zero for the host process 112 since a stub process of the extended process has no text, stack or data memory areas. When the kernel is performing functions associated with the stub process, the kernel maintains a kernel stack unique to that stub process in the ublock of the stub process. This is similar to the manner in which the kernel stack is maintained in a single processor UNIX system when the process is executing in the kernel mode. Entries 428, 429 and 430 contain the necessary information so that the user process of the extended process, newuser process 111, has a text area, data area and a stack for the execution of the program that was obtained from the a.out file as described earlier.

In the user process of the extended process, the variables lockip and execip, entries 431 and 432, respectively, are used to identify the old and new a.out files. In the present example, computer 103 is storing the new a.out, and computer 103 is storing the old a.out file. Entry 431 points to the old a.out file, and entry 432 points to the new a.out file which is executed as a result of the exec system call. If both files are local to the processor executing the user process of the extended process, then these entries are pointers which point into the inode table maintained by the kernel of the local processor in a standard UNIX system manner to identify the local files. The system file table is not used since the a.out files are not used by the process directly but rather by the kernel. However, if the file is remote, e.g. associated with another processor, the entry contains an identification of an entry in the user process port table such as port table 440. For example, this entry in port table 440 then identifies the virtual channel and remote entries such as 411 or 412 are identified in a stub process of the extended process. For example, if entry 431 indicates a remote file, then it points to a corresponding entry 411 in the stub process associated with the processor that is local to the remote file. More information concerning these entries is given with respect to FIG. 6.

In general, the ublock of a stub process of the extended process contains three types of entries with respect to the ublock of the user process. The first type is entry 408 which is never used in the stub process but is used in the normal way in the user process. The second type of entry in the ublock of the stub process is an entry which is always used, and an example of this is the acptr entry 414 which is described in greater detail later in this section. The third type of entry in the ublock of the stub process is an entry which is only populated as needed with the necessary information being transferred over from the user process of the extended process when the requesting packet to perform a particular function is transmitted from the user process to the stub process. One example of this is the dirp entry 413, and other examples are entries 411 and 412. The entry 413 is a pointer which points to the path name. In the user process of the extended process, this entry always points into the user's address space to designate the path name. However, in a stub process, the information concerning the path name is received from the user process and is then stored by the kernel at a convenient location. At this point and time, the kernel sets the dirp entry to point to the path name. An example of when the path name is transmitted is during an open system call. Since the open system call is executed on the processor executing the user process of the extended process, the path name information is not available on the stub process.

The acptr entries 414 and 434 point to the achan list 419 and 439, respectively. An achan list of a user process may have a multitude of structures each defining a virtual channel to a stub process. In the present example, newuser process 111's achan list 439 has a number of structures with each defining a virtual channel to a stub process of the extended process. Each structure comprises link and port pointers and other information for virtual channel operation. These structures are linked together by the link pointers 442 and 435 in a link list. The list is terminated upon the contents of the last link pointer being a null. The virtual channels are identified by the port pointers. The port pointers 431 and 436 point into port table 440. The newuser process 111 identifies the virtual channels associated with it by utilizing acptr entry 434 to point into the link list associated with newuser process 111 in achan list 439. The port pointers then are utilized to access port table 440. Host process 112 similarly has acptr entry 414 which points into the structures containing pointers 415 and 416 of achan list 419. Since a stub process of the extended process can never have more than one virtual channel, the link pointer 415 terminates the link list since the contents of pointer 415 are null. Port number 417 defines virtual channel 314 to newuser process 111. Further detail concerning the virtual channels is given in the copending application of Bishop et al., Case 4-2-1-3-2 which is hereby incorporated by reference.

Figure 5:
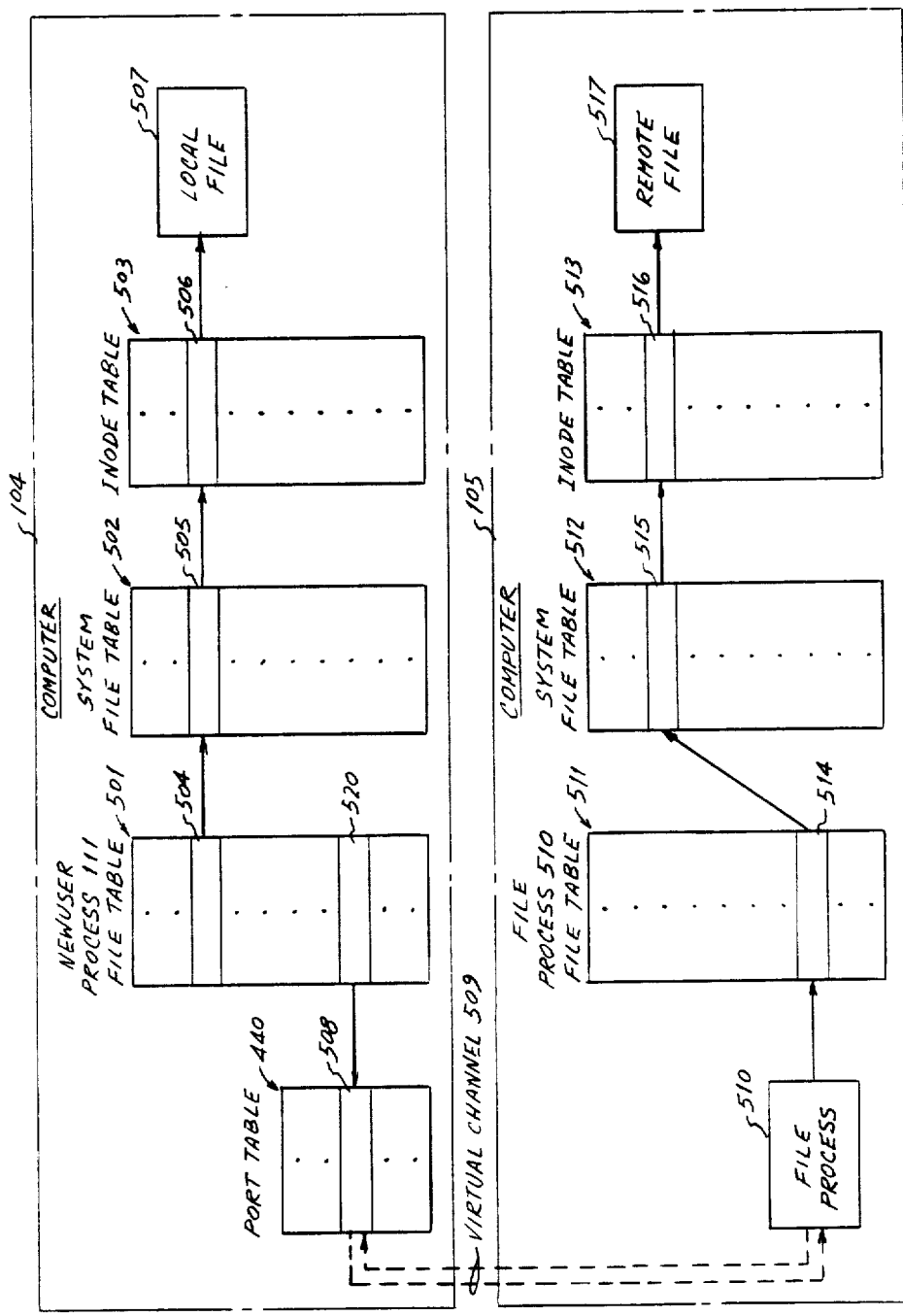
FIG. 5 illustrates, in block diagram form, the file control structure for an extended process executing on the processors of FIG. 1.

Consider the virtual channels in light of blocks 234 and 236 of FIG. 2. When the reconnection information is initially transmitted by block 234, the stub processes of the extended process have virtual channels set up with olduser process 109 which at that point in time is the user process in a similar manner as illustrated in FIG. 4. Upon receiving the reconnect information, each receiving kernel updates the port table and the other channel information resulting in the stub process' virtual channel being connected to newuser process 111 rather than olduser process 109. Part of operations performed by block 236 is to transform achan list 439 and port into the tables illustrated in FIG. 4. Block 226 changes olduser process 109's tables into tables similar to those illustrated for host process 112 in FIG. 4. FIG. 5 illustrates the manner in which the files of the extended process are identified by the user process of the extended process. If a file is local to the processor that is executing the user process of the extended process, such as computer 104 and newuser process 111, then the standard UNIX system file control structure is utilized. For example, local file 507 is identified via entry 504 of file table 501. The latter table is part of the ublock of newuser process 111 and is referred to as the u_ofile structure. The contents of entry 504 in turn identify entry 505 of system file table 502. The system file table 502 is then utilized to point to inode table 503 and entry 506. Entry 504 is identified in table 501 by using the file descriptor number associated with file 507 in a normal UNIX system manner. Entry 506 then identifies the local file 507 in a normal UNIX system manner. If the file is remote such as remote file 517, which is assumed to be local to computer 105, then entry 520 identifies that this file is remote and rather than pointing into system file table 502 points into port table 440. The file descriptor number for file 517 is used to access entry 520. Entry 508 is identified in table 440 by entry 520 of port table 440 which identifies virtual channel 509. Virtual channel 509 is interconnected as previously described into file process 510 which is a stub process of the extended process. A packet containing the file descriptor number for file 517 is transmitted to the kernel of computer 105. The latter kernel uses the file descriptor number to identify entry 514 of file table 511 which is in the ublock of file process 510. The file control structure then identifies remote file 517 in a normal UNIX manner via entries 515 and 516 in tables 512 and 513, respectively.

Figure 6:
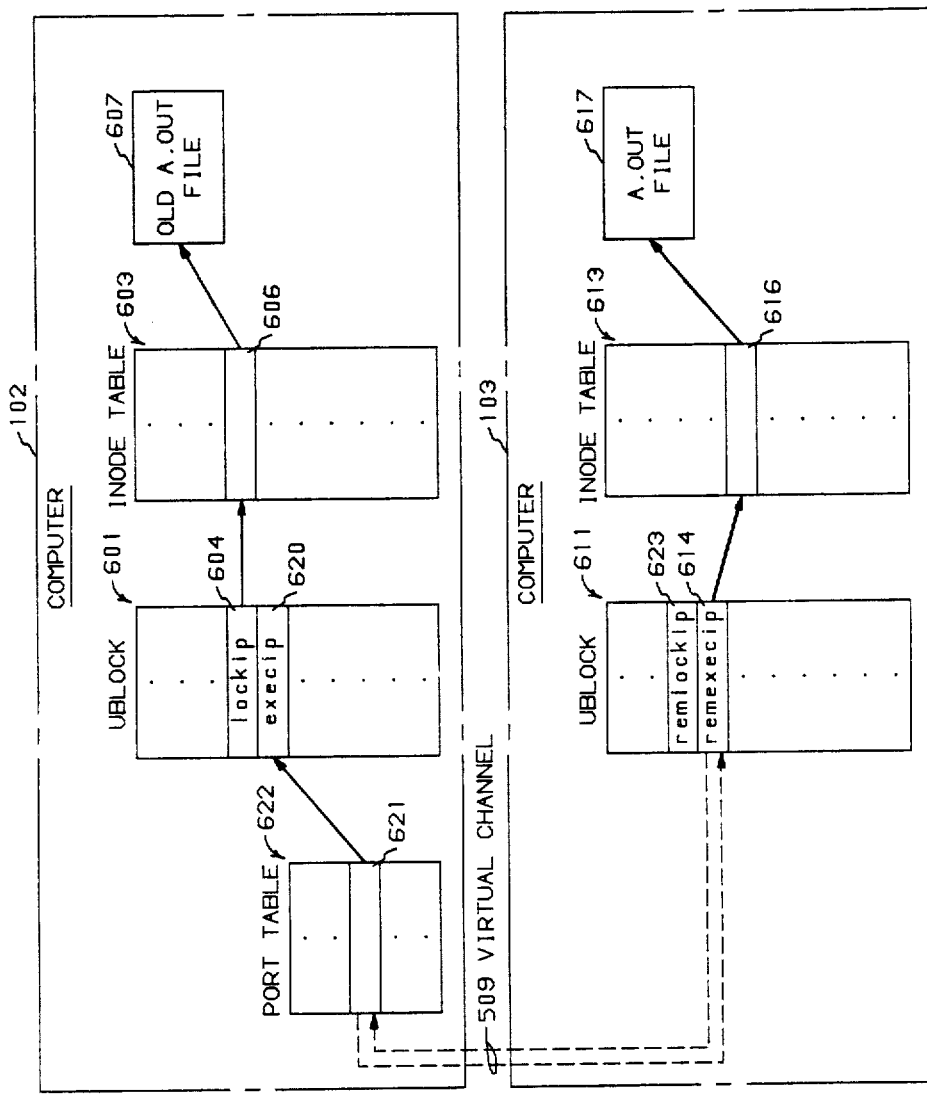
FIG. 6 illustrates, in block diagram form, the file control structure for accessing a.out files for an extended process executing on the processors of FIG. 1.

FIG. 6 illustrates in greater detail the utilization of the lockip and execip variables in the user process of the extended process and the remlockip and remexecip variables in a stub process of the extended process. FIG. 6 shows that the state of the multiprocessor system illustrated in FIG. 1 before the execution of block 224 of FIG. 2. At this time, the user process of the extended process is olduser process 109 being executed by computer 102. FIG. 6 assumes that the original a.out file which was used to execute the exec system call, is local to computer 102. In the present example, the original a.out file is old a.out file 607. The new a.out file from which the new program is to be obtained is remote and is associated with computer 103. This file is denoted as a.out file 617. The stub process of the extended process being executed on computer 103 is a.out process 110. Illustrated for olduser process 109 is its ublock 601 and port table 622. Illustrated for a.out process 110 is its ublock 611. Entry 604 of ublock 601 of olduser process 109 identifies old a.out file 607 in a standard UNIX system manner utilizing entries 604 of ublock 601 and entry 606 of inode table 603. Since the lockip variable identifies a local file, there is no corresponding remlockip variable used in any stub process associated with the extended process.

The new a.out file, however, is remote from computer 102. Entry 620 of ublock 601 rather than pointing into inode table 603 points to entry 621 in port table 622. Entry 621 identifies virtual channel 509 which is connected to ublock 610 of a.out process 110. Entry 614 of ublock 610 then points entry 616 of inode table 613 to a.out file 617. Since the old a.out file is local to computer 102, entry 623, remlockip variable, is not utilized in ublock 611.

It is to be understood that the above-described embodiment is merely illustrative of the principles of the invention and that other arrangements may be devised by those skilled in the art without departing from the spirit and scope of the invention.

What is claimed is:

1. A method for initiating the execution of a new program represented in an object code file by an extended process comprising primary and auxiliary processes in a multiprocessor system having a plurality of processors including an initiating processor and a file processor and a host processor, and each of said processors having a plurality of memory location and each of said processors capable of executing a plurality of processes, comprising the steps of:

executing by said initiating processor a first primary process having program, control, and a data memory locations allocated in said initiating processor to determine said file processor having an auxiliary memory unit storing said object code file of said new program;

creating by said file processor a first auxiliary process in said file processor and said first auxiliary process having only control memory locations allocated in said file processor upon said file processor having been determined to be different from said initiating processor;

reading a portion of said object code file by said first primary process executing in said initiating processor using said first auxiliary process in said file process to access said object code file from said auxiliary memory unit;

selecting a processor to execute said object code file of said new program by said initiating processor using the read portion of said object code file in conjunction with said host processor;

creating by the selected processor a second auxiliary process in said selected processor and said second auxiliary process having only control memory locations allocated in said selected processor upon said selected processor being different from said initiating processor;

transferring process information from said control memory locations of said first primary process by said initiating processor to said second auxiliary process in said selected processor;

transforming by said selected processor in response to the transferred process information said second auxiliary process into a second primary process having program, control, and data memory locations allocated in said selected processor;

obtaining said object code file from said file processor by said second primary process in said selected processor using said first auxiliary process in said file processor; and executing said object code file by said second primary process in said selected processor in conjunction with said first auxiliary process in said file processors.

2. The method of claim 1 wherein said host processor executes a function for managing processor assignment and said selecting step further comprises the steps of:

communicating a first packet to said host processor by said initiating processor to request assignment of one of said processors to execute said new program;

assigning said selected processor for executing said new program by said host processor executing the managing function; and communicating the assignment via a second packet to said initiating processor by said host processor.

3. The method of claim 2 wherein said step of transforming comprises the step of changing said first primary process into a third auxiliary process by said selected processor.

4. The method of claim 3 wherein said step of claim 3 wherein said step of transforming further comprises the step of sending a third packet by said selected processor to said first auxiliary process to inform the latter process that said second auxiliary process has become said second primary process and that said first primary process has become said third auxiliary process.

5. The method of claim 4 wherein said system initially has other primary processes in communication with said first primary process and said step of transforming further comprises the step of sending packets by said selected processor to each of said other processes to inform said other processes that said second auxiliary process has become said second primary process and that said first primary process has become said third auxiliary process.

6. An apparatus in a multiprocessor system for initiating the execution of a new program represented in a object code file by an extended process comprising primary and auxiliary processes and said multiprocessor system having a plurality of processors including an initiating processor and a file processor and a host processor, and each of said processors having a plurality of memory locations and each of said processors capable o executing a plurality of processes, comprising:

means for executing in said initiating processor a first primary process having program, control, and data memory locations allocated in said initiating processor to determine said file processor having an auxiliary memory unit storing said object code file of said new program;

means in said file processor for creating a first auxiliary process in said file processor and said first auxiliary process having only control memory locations allocated in said file processor upon said file processor having been determined to be different from said initiating processor;

said initiating processor executing said first primary process for reading a portion of said object code file using said file processor to execute said first auxiliary process to access said object code film from said auxiliary memory unit;

means in said initiating processor for selecting a processor to execute said object code file of said new program by using the read portion of said object code file in conjunction with said host processor;

means in the selected processor for creating a second auxiliary process in said selected processor and said second auxiliary process having only control memory locations allocated in said selected processor upon said selected processor being different from said initiating processor;

means in said initiating processor for transferring process information from said control memory locations of said primary process to said second auxiliary process in said selected processor;

means in said selected processor for transforming said second auxiliary process into a second primary process having program, control, and data memory locations allocated in said selected processor; and said selected processor executing said second primary process for obtaining said object code file using said file processor to execute said first auxiliary process to access said object code file from said auxiliary memory unit;

said selected processor further executes said second primary process for executing said object code file in conjunction with said first auxiliary process on said file processor.

7. The apparatus of claim 6 wherein said host processor executes a function to manage processor assignment and said selecting means further comprises:
 means for communicating a first packet to said host processor by said initiating processor to request processor assignment for said new program;
 means for assigning said selected processor to execute said new program by the managing function; and
 means for communicating the assignment via a second packet to said initiating processor by said host processor.

8. The apparatus of claim 7 wherein said transforming means comprises means for changing said first primary process into a third auxiliary process.

9. The apparatus of claim 8 wherein said transforming means further comprises means for sending a third and a fourth packet said selected processor to said first auxiliary process to inform the latter process that said second auxiliary process has become said second primary process and that said first primary process has become said third auxiliary process.

10. The apparatus of claim 9 wherein said apparatus initially having other primary processes in communication with said first primary process and said transforming means further comprises means for sending packets by said selected processor to each of said other processes to inform said other processes that said second auxiliary process has become said second primary process and that said primary process has become said third auxiliary process.

* * * * *